United States Patent
Danielsson et al.

(10) Patent No.: US 10,510,234 B2
(45) Date of Patent: Dec. 17, 2019

(54) METHOD FOR GENERATING ALERTS IN A VIDEO SURVEILLANCE SYSTEM

(71) Applicant: AXIS AB, Lund (SE)

(72) Inventors: Niclas Danielsson, Lund (SE); Simon Molin, Lund (SE)

(73) Assignee: Axis AB, Lund (SE)

( * ) Notice: Subject to any disclaimer, the term of this patent is extended or adjusted under 35 U.S.C. 154(b) by 47 days.

(21) Appl. No.: 15/851,494

(22) Filed: Dec. 21, 2017

(65) Prior Publication Data

US 2018/0174412 A1 Jun. 21, 2018

(30) Foreign Application Priority Data

Dec. 21, 2016 (EP) .................................... 16205866

(51) Int. Cl.
| | | |
|---|---|---|
| *G06K 9/00* | (2006.01) | |
| *G08B 13/196* | (2006.01) | |
| *H04N 7/18* | (2006.01) | |
| *G06K 9/62* | (2006.01) | |
| *G06K 9/32* | (2006.01) | |

(52) U.S. Cl.
CPC ... *G08B 13/19608* (2013.01); *G06K 9/00718* (2013.01); *G06K 9/00771* (2013.01); *G06K 9/3233* (2013.01); *G06K 9/6202* (2013.01); *H04N 7/183* (2013.01)

(58) Field of Classification Search
CPC ........... G06K 9/00335; G06K 9/00718; G06K 9/00771; G06K 9/3233; G06K 9/6202; G08B 13/19608; H04N 7/183
See application file for complete search history.

(56) References Cited

U.S. PATENT DOCUMENTS

| 9,443,320 B1 * | 9/2016 | Gaidon | .................... G06K 9/00 |
| 10,297,026 B1 * | 5/2019 | Jordan | ....................... G06T 7/60 |
| 2007/0279494 A1 * | 12/2007 | Aman | ................... G01S 3/7864 |
| | | | 348/169 |
| 2010/0007736 A1 | 1/2010 | Mori et al. | |
| 2011/0115634 A1 | 5/2011 | Monden | |

(Continued)

FOREIGN PATENT DOCUMENTS

| WO | 2003/044727 A1 | 5/2003 |
| WO | 2011/025359 A1 | 3/2011 |

OTHER PUBLICATIONS

"Semantic Classification of Human Behaviors in Video Surveillance Systems", Alberto Amato et al. (Mar. 10, 2011), XP055388306, Retrieved from the Internet: URL:http://www.wseas.us/e-library/transactions/computers/2011-54-118.pdf.

(Continued)

*Primary Examiner* — Bhavesh M Mehta
*Assistant Examiner* — Ian L Lemieux
(74) *Attorney, Agent, or Firm* — Volpe and Koenig, P.C.

(57) ABSTRACT

A method for generating an alert signal in a surveillance system comprising: detecting a targeted individual in a video stream, selecting the targeted individual, and tracking the targeted individual, as first steps. The method also comprises classifying actions of the detected individual over a plurality of image frames in the video stream in response to the identification of the detected object as being a targeted person, and generating an alert signal if the classified action of the object is classified as a predefined alert-generating action.

12 Claims, 3 Drawing Sheets

(56) References Cited

U.S. PATENT DOCUMENTS

| | | | |
|---|---|---|---|
| 2012/0105630 A1 | 5/2012 | Cao | |
| 2012/0147191 A1* | 6/2012 | Snoussi | G06K 9/00771 |
| | | | 348/159 |
| 2012/0274776 A1* | 11/2012 | Gupta | G08B 13/19641 |
| | | | 348/159 |
| 2014/0341433 A1 | 11/2014 | Haering et al. | |
| 2016/0132731 A1* | 5/2016 | Hisada | H04N 7/181 |
| | | | 382/103 |
| 2016/0232777 A1* | 8/2016 | Jedwab | G08B 25/001 |
| 2016/0379083 A1* | 12/2016 | Sala | G06K 9/52 |
| | | | 345/633 |
| 2017/0099200 A1* | 4/2017 | Ellenbogen | H04L 43/04 |

OTHER PUBLICATIONS

"A Constrained Probabilistic Petri Net Framework for Human Activity Detection in Video", Albanese et al.; IEEE Transactions on Multimedia, IEEE Service Center, Piscataway, NJ, US, vol. 10, No. 6 (Oct. 1, 2008) pp. 982-996, XP011236996.
EP 16 20 5866.3 European Search Report (dated Jul. 12, 2017).

* cited by examiner

METHOD FOR GENERATING ALERTS IN A VIDEO SURVEILLANCE SYSTEM

FIELD OF INVENTION

The present teachings relate to a method for tracking objects, and in particular to a method for generating alerts in a video surveillance system.

BACKGROUND

Within the field of video surveillance, and video analysis, action recognition is an area of development. The purpose of action recognition is to enable automatic detection of actions performed by objects in a surveilled scene, generally human actions. An example could be that while a perimeter sensor could generate an alert when an individual or object is entering a particular area, action recognition may generate an alert when the same individual assumes a hostile pose. The development is catalyzed by improved image processing techniques, deep learning etc, enabling more advanced processing in shorter times.

There are several known techniques for action recognition, and they may be divided into spatial techniques and temporal techniques, wherein spatial techniques, for example, include various ways of classifying poses in a still image (or a single image frame) while temporal techniques typically involve the evaluation of a chain of events, for example, evaluation of poses in a series of image frames. Neural networks may be utilized for performing the action recognition, yet state of the art techniques also include support vector machines and the like. The techniques used for action recognition are not the focus of the present application, yet some more examples will be given in the detailed description.

In a modern surveillance situation, it is often the case that a vast amount of information is collected to a control center, where one or more operators review the information live. The information, typically includes a number of live video streams. More often than not, there is a recording function enabling review of the information afterwards, but there is a benefit in being able to react momentarily to unwanted actions occurring in one of the surveilled scenes rather than only being able to analyze in retrospect. In theory it would be possible to track and analyze everything being caught by the video camera. In reality both the human factor and current limitations in processing performance make such an approach, (i.e., live evaluation of all information caught by a number of video cameras), unrealistic.

The present teachings aim to provide an improved operator support, in particular for complex surveillance situations.

SUMMARY

In view of the above, it is thus an object of the disclosure to eliminate or alleviate the above problems by providing an improved method for generating alerts in a video surveillance system.

According to a first concept, there is provided method for generating an alert signal in a surveillance system (motion video camera), comprising detecting a targeted individual in a video stream, selecting the targeted individual, tracking the targeted individual, classifying actions of the detected individual over a plurality of image frames in the video stream in response to the identification of the detected object as being a targeted person, and generating an alert signal if the classified action of the object is classified as a predefined alert-generating action.

Identification of an individual may be based on any existing technique for the technical field. Often an output includes an appearance model (such as appearance vector or feature vector) that may be compared to a stored appearance model.

The disclosure, according to this first aspect, addresses the need for optimizing tracking processes and in particular the generation of alerts. From a surveillance point of view there is a benefit in being able to backtrack the actions of individuals in order to sort out a particular chain of events, and as such video surveillance has been a highly useful tool throughout its application. Video surveillance has also been effective in focusing on particular individuals so as to, for example, catch someone in the act of performing a prohibited action. The surveillance system may be a motion video camera.

In the present application the word "prohibited" has been used throughout for describing an alert-generating action. This is simply because the most apparent use case involves detection of actions that would be considered prohibited. Nevertheless, this does not exclude actions that would be considered interesting for another reason, and a broader term would simply be "alert generating", which in turn would render the text a bit cumbersome to read. So, for the sake of simplicity, we stick to "prohibited" and tint it with the meaning "action that we would like to react on, that should not occur without a reaction".

It is obvious how the present teachings may facilitate the work for an operator and increase the efficiency of a surveillance system.

In one or more embodiments, it may be preferred that the action recognition is performed on a subset of the image frame, for example, a crop including the targeted individual but not the entire image frame. In this way the computational load is reduced significantly, in particular for a view containing a large number of individuals. This of course implies that some individuals in the scene will be disregarded (only the individuals having been selected and tracked will be actively surveilled).

Comparing a surveilled individual with the contents of a database is a straightforward way of initiating a tracking sequence, irrespective if the identification and/or the comparison is performed manually or automatically.

The system may output an individualized feature vector or appearance vector for later reference.

In one or more embodiments, the identification of a target person is performed by a recognition algorithm, whereby the identification could be automized to the benefit of an operator. In this embodiment the operator may or may not be alerted that an individual has been identified and that tracking has been initiated. In an embodiment where the operator is alerted the operator may be prompted whether the tracking should be discontinued or not.

The database with which comparison is made, manually or automatically, may comprise previously identified individuals, and in the present context identified implies identified by name, or merely identified in the sense that their identity remains unknown but that they have been the subject of some previous control or surveillance. The database may comprise images of the identified individuals and/or feature vectors representing the identified individuals.

In addition, or instead, the database may comprise sets of identified attributes relevant for a particular surveillance situation or location. Examples of attributes could be 'carries a bag', 'eyes not visible'/'face masked', and the like (i.e., attributes that may not be suspicious in an everyday situation, but depending on context it may be worth to note).

According to a set of embodiments, the predefined alert generating action may be selected in a database comprising a set of "prohibited" actions. This embodiment has several levels of complexity. In the first level there may only be a certain number of actions that may be identified, and among these a portion are considered prohibited. Furthermore, for a specific surveillance situation one set of actions would be considered prohibited while in another set of actions would be considered prohibited. These sets would be different in a warehouse compared to in a sports arena or a railway station.

Furthermore, once an individual is identified a preset set of actions may be alert generating based on the surveillance situation ("in this area the following actions will be prohibited"), yet in other or related embodiments the set may be decided based on a particular individual ("for this person the following action would be prohibited and alert generating"), for example, for a known shoplifter. This will be further addressed in the detailed description.

In an even further refined embodiment, the selection of alert generating actions may be correlated to the individual and/or to a particular area. The selection of alert generating actions may be correlated to a particular individual. Examples include that the operator or the system recognizes an individual having performed prohibited actions before, and in such a case the individual could be tracked for the event that the prohibited action is repeated. This embodiment could be performed without interaction of the operator, at least until an alert has been generated. Furthermore, the selection of alert generating actions may be associated with a particular area, and as an example selections could include that in some areas the most common prohibited actions may be running and looting, while in others it could be "showing signs of aggression", "formation of a group of individuals" and the like. This is yet another way of reducing the computational load in connection with targeted action recognition.

In one or several embodiments, the selection of alert generating actions is prompted upon selection of a targeted individual. Several alternatives are enabled by these embodiments. One example could be that selection window is presented as an operator identifies a person, for example, by clicking on that person. In the selection window the operator may select a number of actions that would be considered prohibited for that particular person. The available selections could correspond to all available actions that may be recognized, or the available selections could also be limited to a subset of actions relevant for the particular individual, for example, prohibited actions that the individual is known to have performed before. If an individual is identified automatically a selection pane may be arranged to appear as the individual is identified and the operator may dismiss the pane or make a selection to be activated. A selection pane is merely an example among many possible ways of presenting a query.

In any embodiment, the action recognition is at least partly performed by an image processing algorithm in the camera. The action recognition may also be performed in its entirety by an image processing algorithm in the camera.

In one or more embodiments, an action candidate recognizer is configured to apply a first action recognition algorithm to the object image frame and thereby detecting presence of an action candidate; a video extractor configured to produce action image frames of an action video sequence by extracting video data pertaining to a plurality of image frames from the video sequence, wherein one or more of the plurality of image frames from which the video data is extracted comprises the object of interest; and a network interface configured to transfer the action video sequence to the server. The server comprises an action verifier configured to apply a second action recognition algorithm to the action video sequence and thereby verify or reject that the action candidate is an action. This is further disclosed in a co-pending application of the present applicant, as is detailed in another section of the present application.

In one or more embodiments, the action classification may be performed using a camera-based image analytics (the image processing algorithm), while in other or related embodiments the action classification is supported or performed by a remote device as discussed above.

The method may further comprise a handover from a first device to a second device of the surveillance system, including communication of a an appearance vector to a network of video cameras.

In one or several embodiments, an appearance vector of the targeted object is recorded to a database, either as a new post or as an update.

The action recognition may be based on a spatial/contextual recognition approach, or a temporal recognition approach.

According to a second aspect, there is provided a system comprising a digital network camera, having an image processing circuitry, an object identifier, an object tracker, an alert generator, wherein the latter may form part of the digital network camera or be comprised in a server-based solution (a server or a network of servers), and the system further comprising a user interface, wherein said system is configured to perform the method according to one or any embodiments disclosed in the present application.

According to yet another aspect, there is provided a computer program product, comprising a computer-readable storage medium with instructions adapted to carry out the method according to the description above or below when executed by a device having processing capability.

It should be noted that the invention relates to all possible combinations of features unless explicitly stated otherwise.

A further scope of applicability of the present teachings will become apparent from the detailed description given below. However, it should be understood that the detailed description and specific examples, while indicating embodiments, are given by way of illustration only, since various changes and modifications within the scope of the teachings will become apparent to those skilled in the art from this detailed description. Hence, it is to be understood that the teachings described herein are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where.

DETAILED DESCRIPTION

In a practical situation, a single operator may be responsible for monitoring several camera views simultaneously. In a store, typically, surveillance cameras may cover the entrance, the checkout line and a number of positions inside the store. If a suspicious individual is targeted this will imply that the awareness of other views is lowered, since the operator will have an increased awareness in relation to the targeted individual.

According to the present teachings, the operator may make an active choice when a targeted person is selected for tracking, (i.e., identified as an object to be tracked). As a result, the attention of the operator may be turned elsewhere, and the system will generate an alert signal if one of the prohibited actions in conducted, whereby the operator may be notified for full review of the situation.

Figure 1:
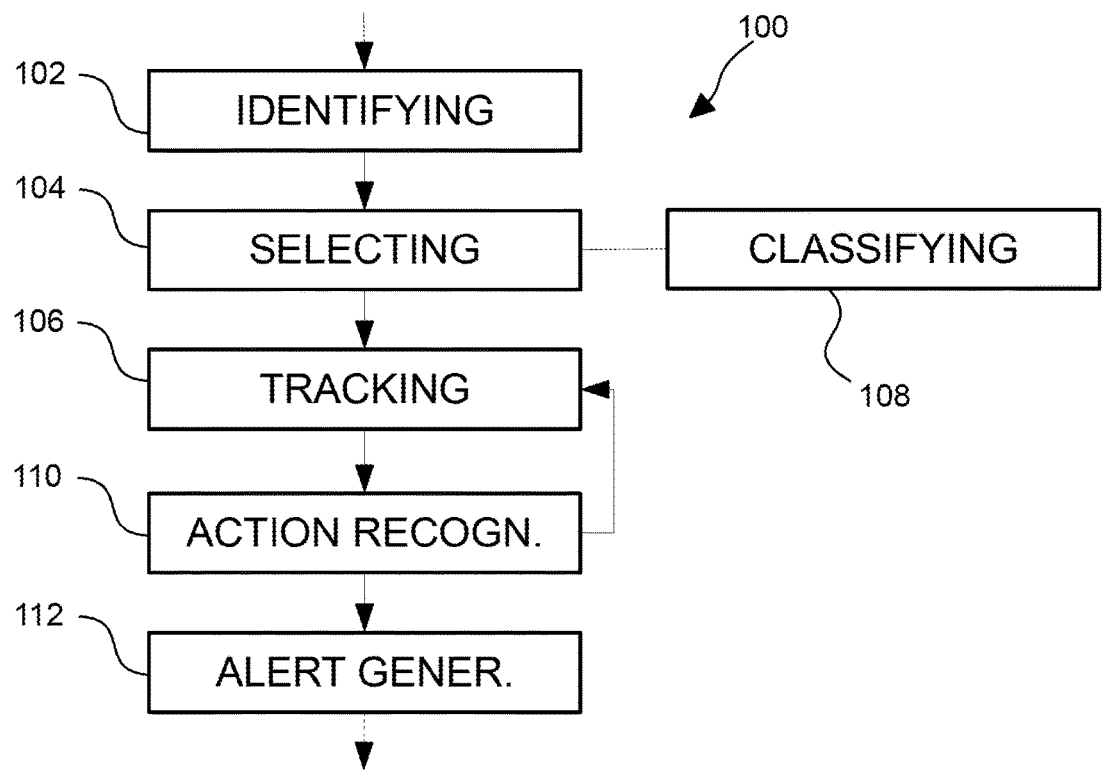
FIG. 1 is a flow chart illustrating a first embodiment of the present invention.

FIG. 1 illustrates the method according to a first embodiment 100 thereof. The method 100 is initiated by a step of detecting 102 a targeted individual in a scene. In fact, the individual is yet to be targeted, but for the sake of simplicity the term "targeted individual" is used rather than "an individual which possibly may be targeted at a later stage". In practice this step is often preceded by an automated step performed by an object detection algorithm or motion detection algorithm that recognizes that an individual has entered the imaged scene, and that the individual is located in a particular area, often resulting in that the individual (or other moving object) is high-lighted by a rectangle. In the second step 104 the operator will select the targeted individual. If the individual is already marked with a rectangle or in any other way, the selection is likely to be conducted by using a marker to click, in the view, in the near vicinity of the individual in question.

When selection is effected the tracking 106 of the targeted individual may be initiated automatically or upon user request, by means of communication via any suitable interface. Furthermore, a set of actions that may be conducted by the target individual are classified 108 as prohibited (as defined in the context of the present description). This will be discussed in more detail referring to other embodiments, but it may be stated already that the classification of actions to "prohibited" may be performed in many different ways, both manual and automized.

From this point the system will generate an alert 112 as soon as it is detected that the targeted individual performs an action 110 included in the set of prohibited actions. The alert may be used for several purposes, for example, it could merely generate a marker for later review, or it could generate an immediate notification to an operator as soon as the action is detected. If an action not included in the list of prohibited actions is identified, the system will merely return to tracking and action recognition, without generating any alert.

These are the main building blocks of any embodiment of the present disclosure, yet any of the building blocks may be further refined in order to provide more elaborate solutions to the benefit of an operator or user of the system performing the method. Some of these elaborations will be described in the following, and the skilled person should realize that the refined building blocks may be combined freely, unless logically impossible, for the formation of alternative embodiments of the method.

Figure 2:
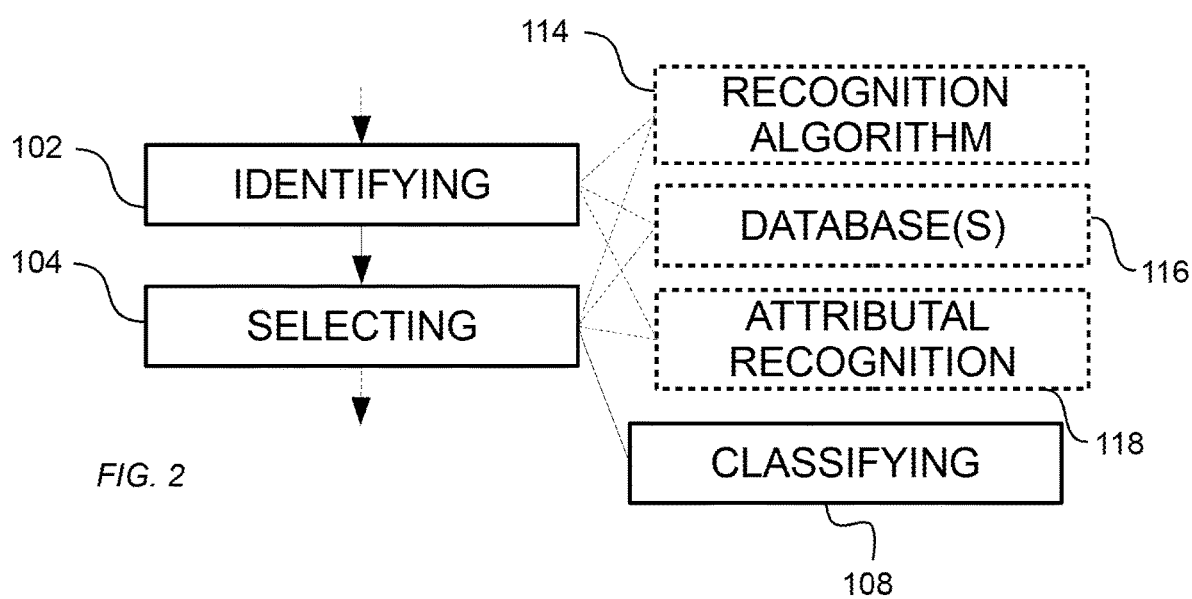
FIG. 2 is a partial flow chart illustrating a number of possible embodiments for a sequence as disclosed in the embodiment of FIG. 1.

FIG. 2 is a partial flow chart illustrating a number of possible embodiments for a sequence as disclosed in the embodiment of FIG. 1. For example FIG. 2 shows the step of detecting and selecting an individual.

An individual may be detected in many different ways, and the step of selecting the individual may be closely related to the detection. In one embodiment the individual is detected and targeted merely by being selected by the operator, there is no further logic behind it. The operator could be supported by a database 116 containing individuals of particular interest. The database may or may not be integrated with the system performing the method. The operator may also be supported by a recognition system 114 presenting a likely identity of the individual. If it is a fact that a particular individual will always be selected, for example, a known shoplifter entering a store, the entire step of detecting and selecting may be performed more or less automatically, with or without sending an alert to the operator that tracking as been initiated.

According to other or combined alternatives, the individual is not identified based on personal appearance but rather on attributes 118. The attributes may be physical, such as if the person is carrying a bag, pushes a trolley, carries an unappropriate tool, and the like. To sum up, this portion of the method may be very simple, yet it may also be elaborate and only limited by available technology.

One or more actions may be classified as prohibited for the individual.

Again, this step may be more or less elaborate, and there are numerous different possible alternatives. In one embodiment, the prohibited actions are preset, meaning that regardless of the particular targeted individual the same set of actions will be considered prohibited. This may in turn have a further alternative in that the selection depends on a particular area rather than on a particular individual.

In other embodiments, the set of prohibited actions is defined by the operator, and in still other or related embodiments the set of prohibited actions is fully or partly defined by the identified individual. The latter does not imply that the identified individual performs the selection but that for a particular individual a tailor-made set of actions may be fully or partly preset. No matter how the set of prohibited actions is deduced, an operator may—in one or more embodiments—be able to fine-tune the set by adding or removing actions.

The set of prohibited actions may be associated with a location, meaning that a particular action is prohibited in a particular area only, such that an alert is generated only if the action is performed within that particular area.

The actions in question could also be related to a class of objects, for example, it could differentiate between a child and an adult, an employee and a non-employee, and the set of alert-generating actions could be adjusted accordingly. The actions in question could be related to an individual object, for example, this person should not be allowed to carry a bag in this area, and the like.

Figure 3:
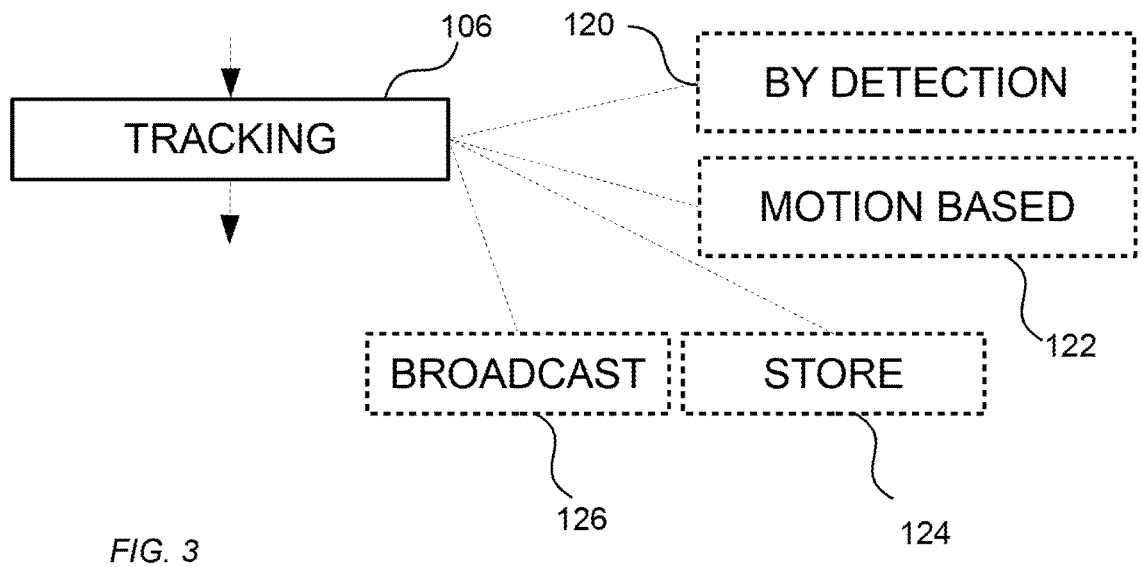
FIG. 3 is a partial flow chart illustrating a number of possible embodiments for a step as disclosed in the embodiment of FIG. 1.
Figure 4:
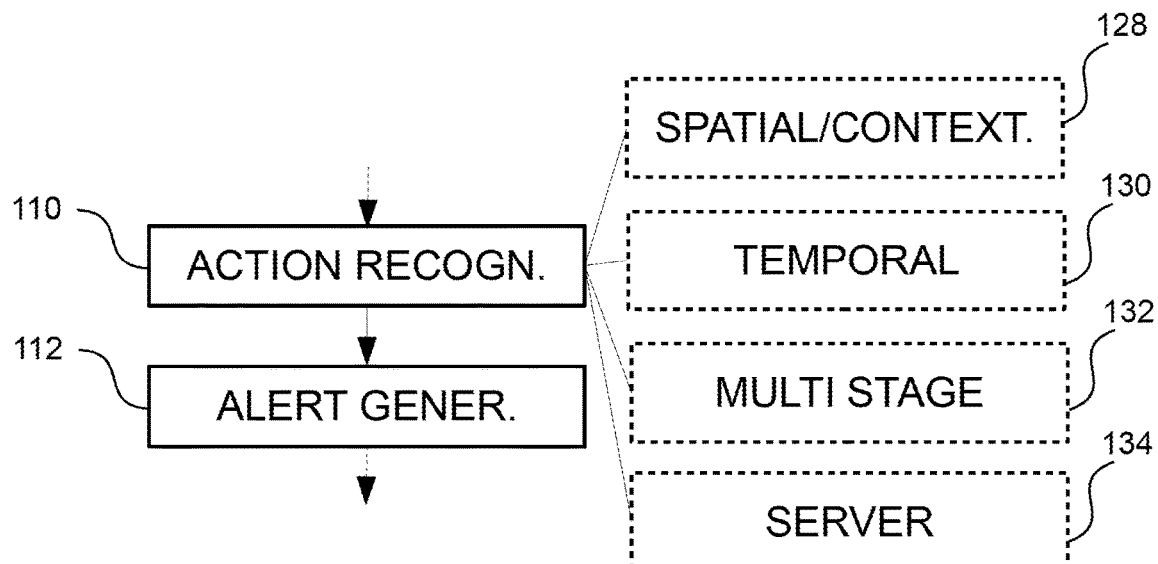
FIG. 4 is a partial flow chart illustrating a number of possible embodiments for a sequence as disclosed in the embodiment of FIG. 1.

FIG. 3 is a partial flow chart illustrating a number of possible embodiments for a step as disclosed in the embodiment of FIG. 1. For example, FIG. 3 shows the step of tracking an individual.

The step of tracking the individual may be conducted in any of the existing ways. If a single camera is used and the individual never leaves the scene the tracking is quite straightforward, and could be performed according to one of the techniques "tracking by detection" 120 or "motion based tracking" 122, or by another or combined present or novel technique ensuring that the same individual is tracked over a single or several scenes, such as tracking by re-identification.

The present teachings have distinct advantages in systems where several surveillance cameras are involved, since that is a typical situation where the operator may benefit from extra support. In such a situation an appearance model may be made available for all cameras within the system, either by being stored 124 at a location available to all cameras (or at least the relevant ones), or broadcasted 126 to other cameras of the system.

Action recognition is an enabler for the present teachings rather than a main issue, but still some alternatives may be mentioned. Some have already been mentioned in the background section of the present application, and the conclusion is that any method for action recognition may be used. There are, however, two features that may be relevant for the field of video surveillance. One is that the action recognition should be performed on the fly, since an immediate alert is appreciated, and the other is that there may be limitations to the processing performance available onboard the camera. For straightforward action recognition techniques, such as techniques based on spatial or contextual information 128, these features rarely result in any problems. However, for state of the art techniques where a large amount of data have to be processed it may generate problems, for example, that the processing performance is inadequate. Examples of the latter are techniques where a temporally resolved sequence of images is used 130.

An example of a contextual action recognition algorithm is disclosed by Georgia Gkioxari, Ross Girshick and Jitendra Malik in "Contextual Action Recognition with R*CNN"; arXiv:1505.01197. Further examples of action recognition algorithms, both Contextual and/or spatial action recognition algorithms and temporal action recognition algorithms are for example described in CN102855462, in CN103106394, and by Karen Simonyan and Andrew Zisserman in "Two-Stream Convolutional Networks for Action Recognition in Videos"; arXiv:1406.2199.

Disregarding the technique used it may be preferable to only perform the action recognition on the smallest possible part of the image, suggestively a cutout (a crop) including the targeted individual. In some embodiments it would be sufficient to only include the portions of the individual likely to be active in an action of the prohibited kind (an even smaller crop) while in still other embodiments it may be preferable to include parts of the surroundings for the purposes of being able to make a contextual evaluation (a slightly larger crop).

In other embodiments, the action recognition is performed as a two-stage process 132. In the first stage, an initial recognitions is made, suggestively based on an action recognition technique of low complexity, such as a technique only evaluating a current pose of the targeted individual. In the second stage, a confirmation is made using a more complex technique, such as a technique using temporally resolved information. This enables a quick 'on-the-fly' alert followed by a confirmation. For instances where the more complex technique is computationally demanding, the information, for example, image frames or crops of image frames, necessary for performing the action recognition may be transferred to a server 134 having superior computational power compared to the camera. This technique is disclosed in a co-pending application (European patent application EP16198671.1, filed Nov. 14, 2016) by the present applicant/assignee, which application is incorporated by reference. In particular, reference is made to FIG. 2 of the referred application as filed together with the associated description.

The alert generation could be performed in several different ways, including techniques used for alert generation today as well as novel ways of generating alerts, such as sending a signal to a VMS alerting the operator, sounding an alarm, performing any preset action.

Figure 5:
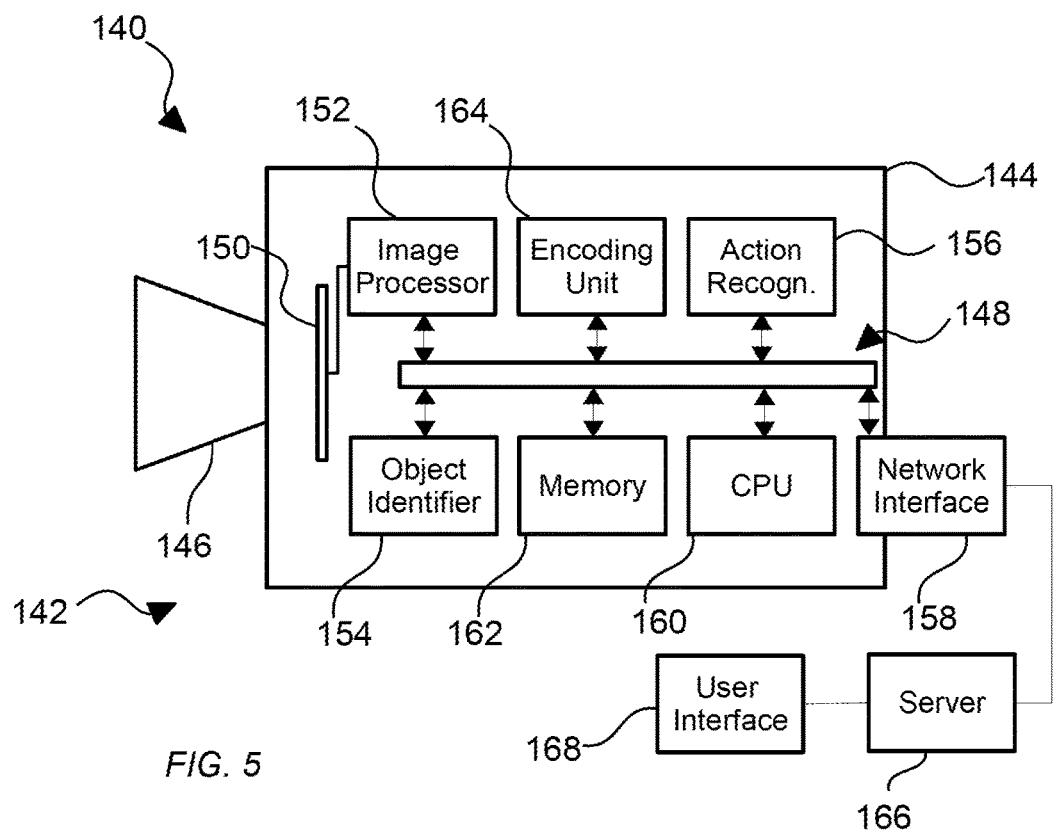
FIG. 5 is a schematic view of a system configured for performing a method according to one or any of its embodiments.

FIG. 5 is a schematic view of a system 140 configured for performing an method according to one or any of its embodiments. The system comprises one or more network cameras, which is more or less all that is required.

The digital network camera 142 is arranged to capture a video sequence depicting a scene. The digital network camera 142 comprises a housing 144, a lens 146 and circuitry 148. The digital network camera 142 is arranged to capture and process, and in some embodiments also store a video sequence. The circuitry 148 comprises an image sensor 150, an image processing unit 152, an object identifier 154, an action candidate recognizer 156 and a network interface 158. The circuitry 148 may further comprise one or more of a central processing unit, CPU, 160, a digital data storage medium (memory) 162 and an encoding unit 164. Any one of the image processing unit 152, the object identifier 154, the action candidate recognizer 156, and the encoding unit 164 may be implemented as a dedicated hardware circuit and/or software module. In case of being software implemented the software may be run on the CPU 160. The CPU 160 may be any suitable CPU for performing digital data processing. It shall also be noted that any dedicated hardware circuit may in part comprise software portions being run on a dedicated processor or on the CPU 160. The digital network camera comprises a tracker (not shown) which is a function performed by the already described components.

The memory 162 may be any kind of volatile or non-volatile memory. Further, the memory 162 may comprise a plurality of memory units. At least one of the plurality of memory units may be used as a buffer memory for buffering data while processing, for example, content of the video sequence.

The digital network camera 142 is arranged to be connected to a digital network, represented by a server 166 via the network interface 158. The connection to the digital network may be wired or wireless. Thus, the network interface 158 may be a network port adapted to 10/100/1000 Mbps data traffic, such as an Ethernet port, a modular port being arranged to receive a modular connector, e.g., a RJ45 connector. Normally, such a RJ45 connector port is arranged to receive a network cable, such as a twisted pair cable (e.g., of cat 5, cat 5e or cat 6). Alternatively, the I/O means of the network port may be a wireless I/O means using mobile internet communication standards (e.g., 1G, 2G, 2.5G, 2.75G, 3G, 3.5G, 3.75G, 3.9G, 4G, 5G) or using WiFi.

The camera components, (i.e., the lens arrangement 146 and the image sensor 150), may be arranged to capture raw images wherein each raw image can be described as light of different wavelengths and originating from different objects and parts of objects. These raw images are then converted from analog to digital format and transferred into the image processing unit 152. According to this embodiment the digital network camera 142 is a camera arranged to capture visible-light images. Alternatively or in combination, the image sensor 150 of the digital network camera 142 may be arranged to capture thermal images, or other types of images.

The object identifier 154 is configured to detect objects of interest in the video sequence captured by the camera 142. The object of interest may, for example, be a human for the purposes of the present teachings, but it may also be a vehicle, an animal, and the like.

The object identifier 154 is further configured to identify the object of interest in one or more image frames of the video sequence.

The system further comprises a user interface 168, via which a user may send commands and perform other communication with the circuitry of the camera. As mentioned a single system may comprise several cameras of the disclosed type, all connected to a digital network, preferably connected to the same digital network. The user interface 168 may connect to the camera 142 directly, or via the server 166.

It is noted that in other or combined embodiments the intelligence may be located separate from the camera, such as on the server 166 implying that the camera basically only serves the purpose of collecting a video stream and forwarding it, with no or limited processing, to another network connected device.

The system is thus configured to perform the method according to one or any embodiment of the present disclosure.

Figure 6:
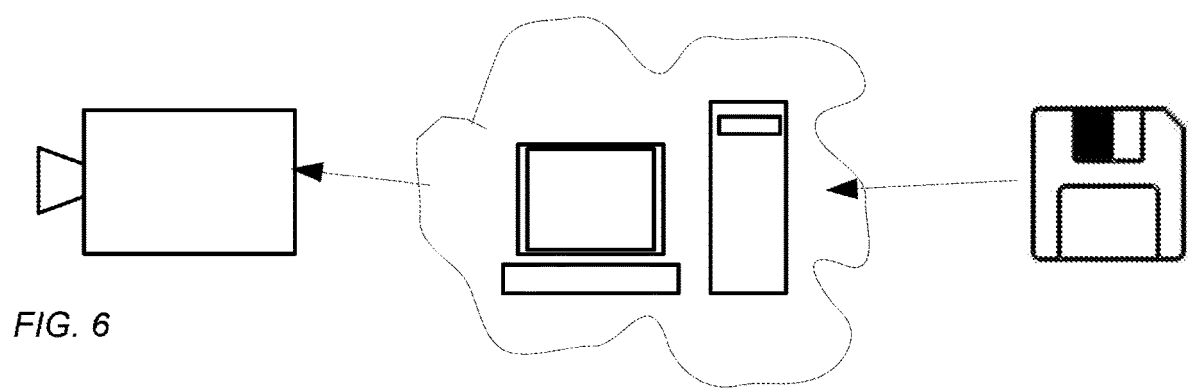
FIG. 6 is a schematic view of a computer program product, comprising a computer-readable storage medium with instructions adapted to carry out the method according to one or any of its embodiments when executed by a device having processing capability.

FIG. 6 is a schematic view of a computer program product, comprising a computer-readable storage medium with instructions adapted to carry out the method according to one or any of its embodiments when executed by a device having processing capability.

Additionally, variations to the disclosed embodiments can be understood and effected by the skilled person in practicing the disclosed teachings from a study of the drawings, the disclosure, and the appended claims.

What is claimed is:

1. A method for generating an alert signal in a surveillance system, the method comprising:
   detecting an object in a video stream;
   selecting the object as a targeted object;
   prompting a selection of a predefined alert generation action from among a set of prohibited actions stored in a database upon the selection of the target object, wherein the selection is correlated to the tracked object and/or a particular area;
   tracking the targeted object;
   cutting out a part of each image frame of the video stream, wherein the part of each image frame includes the targeted object;
   recognizing actions conducted by the tracked object by analyzing the cut out parts;
   classifying the recognized actions; and
   generating an alert signal if one or more of the actions of the tracked object is classified as the predefined alert-generating action.

2. The method of claim 1, wherein the detecting is performed by an object detection algorithm or motion detection algorithm.

3. The method of claim 1, wherein the selecting the object as the targeted object is performed by comparing an appearance model for the object with a database of appearance models for multiple objects.

4. The method of claim 3, wherein an appearance model of the targeted object is recorded to the database, either as a new post or as an update.

5. The method of claim 1, wherein the selecting the object as the targeted object is performed by a recognition algorithm.

6. The method of claim 1, wherein the recognizing actions is performed as a two-stage process, in a first stage a first action recognition is performed, at a camera capturing the video stream, for detecting an action candidate, and in a second stage video data comprising the object triggering the action candidate is sent to a remote server for verifying or rejecting the action candidate as a true action.

7. The method of claim 1, further comprising performing a handover from a first device to a second device of the surveillance system, wherein the handover includes handing over an appearance model describing the tracked object.

8. The method of claim 1, wherein the recognizing actions is based on a spatial/contextual recognition approach, a temporal recognition approach or a combination of the two.

9. A system comprising:
   a digital network camera, wherein the digital network camera includes an image processing circuitry configured to capture a video stream;
   a processor configured to:
   detect an object in the video stream;
   select the object as a targeted object;
   prompt a selection of a predefined alert generating action from among a set of prohibited actions stored in a database upon selection of the target object, wherein the selection is correlated to the tracked object and/or a particular area;
   track the targeted object, wherein the targeted object is included in a cut out part of each image frame of the video stream;
   recognize actions conducted by the tracked object by analyzing the cut out parts and classify the recognized actions;
   a second processor configured to generate an alert signal if one or more of the actions of the tracked object is classified as the predefined alter-generating action; and
   a user interface configured to receive commands from a user and to communicate with the digital network camera, the first processor, and the second processor.

10. The system of claim 9, wherein the second processor forms part of the digital network camera.

11. The system of claim 9, wherein the second processor is found in a server.

12. An article of manufacture including a non-transitory computer-readable storage medium having instructions stored thereon for generating an alert signal in a surveillance system, execution of which by a computing device causes the computing device to perform operations comprising:
   detecting an object in a video stream;
   selecting the object as a targeted object;
   prompting a selection of a predefined alert generation action from among a set of prohibited actions stored in a database upon the selection of the target object, wherein the selection is correlated to the tracked object and/or a particular area;

tracking the targeted object;

cutting out a part of each image frame of the video stream, wherein the part of each image frame includes the targeted object;

recognizing actions conducted by the tracked object by analyzing the cut out parts;

classifying the recognized actions; and generating an alert signal if one or more of the actions of the tracked object is classified as the predefined alert-generating action.

* * * * *